(12) United States Patent
Chambriard et al.

(10) Patent No.: US 9,505,272 B2
(45) Date of Patent: Nov. 29, 2016

(54) CROWN FOR AN AIRCRAFT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: François Chambriard, Clermont-Ferrand (FR); Gilles Roche, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 196 days.

(21) Appl. No.: 14/365,783

(22) PCT Filed: Dec. 18, 2012

(86) PCT No.: PCT/EP2012/075943
§ 371 (c)(1),
(2) Date: Jun. 16, 2014

(87) PCT Pub. No.: WO2013/092581
PCT Pub. Date: Jun. 27, 2013

(65) Prior Publication Data
US 2014/0367013 A1 Dec. 18, 2014

(30) Foreign Application Priority Data
Dec. 20, 2011 (FR) .................................... 11 62030

(51) Int. Cl.
*B60C 11/117* (2006.01)
*B60C 11/03* (2006.01)
(Continued)

(52) U.S. Cl.
CPC .............. *B60C 11/04* (2013.01); *B60C 11/032* (2013.04); *B60C 11/1259* (2013.04);
(Continued)

(58) Field of Classification Search
CPC ... B60C 2200/02; B60C 11/04; B60C 11/03; B60C 11/032; B60C 2011/0339; B60C 2011/0358; B60C 2011/0365; B60C 2011/0367; B60C 2011/0372; B60C 2011/0374; B60C 2011/0376; B60C 2011/0379; B60C 2011/0381; B60C 2011/0383; B60C 2011/0386; B60C 2011/0388; B60C 2011/039
USPC ....... 152/209.18, 209.17, 209.8, 209.13, 901
See application file for complete search history.

(56) References Cited

U.S. PATENT DOCUMENTS 2,272,879 A * 2/1942 Hargraves ........... B60C 11/0309
152/209.22
2,575,439 A * 11/1951 Billingsley ............. B60C 11/00
152/153

(Continued)

OTHER PUBLICATIONS

PCT/EP2012/075943, International Search Report (ISR), Form PCT/ISA/210, dated Feb. 26, 2013 (including English translation), 6 pgs.

*Primary Examiner* — Eric Hug
(74) *Attorney, Agent, or Firm* — Dickinson Wright PLLC

(57) ABSTRACT

A tire for an aeroplane and, in particular, to the crown of a tire for an aeroplane, having reduced dimensions and mass of the pieces of tread in the event of accidental tire tread separation, without the use of additional devices external to the tire and therefore without penalizing the payload of the aeroplane, having a tread intended to come into contact with the ground via a tread surface, and extending radially between a bottom surface and the tread surface, the tread comprising at least two circumferential ribs adjacent to at least one circumferential groove, each circumferential rib extending radially between the bottom surface and the tread surface, axially between two lateral faces and circumferentially around the entire periphery of the tire, wherein the tread comprises rows of cavities formed in at least one circumferential rib and opening onto the tread surface, the rows of cavities, which are parallel to one another, are inclined with respect to the circumferential direction (XX') of the tire at an angle (i) at least equal to 45°, and the rows of cavities are distributed circumferentially over at least part of the periphery of the tire with a circumferential spacing (p) at least equal to 0.02 times and at most equal to 0.12 times the circumferential length of the periphery of the tire.

8 Claims, 4 Drawing Sheets

(51) Int. Cl.
*B60C 11/04* (2006.01)
*B60C 11/12* (2006.01)

(52) U.S. Cl.
CPC ... *B60C 11/1272* (2013.04); *B60C 2011/0358* (2013.04); *B60C 2011/0372* (2013.04); *B60C 2011/0381* (2013.04); *B60C 2011/133* (2013.04); *B60C 2200/02* (2013.04)

(56) References Cited

U.S. PATENT DOCUMENTS

| | | | | |
|---|---|---|---|---|
| 2,759,512 A * | 8/1956 | Schlichtmann | ........... | B60C 9/20 152/209.17 |
| 3,023,798 A * | 3/1962 | Moore | ............... | B60C 11/0309 152/209.22 |
| 3,111,975 A * | 11/1963 | Sanders | ............... | B29D 30/52 152/209.5 |
| 3,494,401 A * | 2/1970 | Bush | .................... | B60C 11/0306 152/209.18 |
| 3,532,147 A * | 10/1970 | Gough | .................... | B60C 11/00 152/209.16 |
| 3,543,827 A * | 12/1970 | Roberts | ................ | B60C 11/0306 152/209.17 |
| 4,387,754 A * | 6/1983 | Mirtain | ............... | B60C 11/0306 152/209.1 |
| 2006/0005904 A1* | 1/2006 | Helt | .................... | B60C 11/0306 152/154.2 |
| 2007/0051448 A1* | 3/2007 | Yumii | ................ | B60C 11/0318 152/209.18 |
| 2009/0229719 A1* | 9/2009 | Simon | .................... | B60C 11/02 152/209.1 |
| 2010/0170601 A1* | 7/2010 | Ohashi | ............... | B60C 11/0309 152/209.15 |

* cited by examiner

CROWN FOR AN AIRCRAFT TIRE

This application is a 371 national phase entry of PCT/EP2012/075943, filed 18 Dec. 2012, which claims benefit of FR 1162030, filed 20 Dec. 2011, the entire contents of which are incorporated herein by reference for all purposes.

BACKGROUND

1. Field

The present invention relates to a tire for an aeroplane and, in particular, to the crown of an aeroplane tire.

2. Description of Related Art

Aeroplane manufacturers are constantly concerned with passenger safety and, therefore, with reducing the risks of failure of their craft. Of the failure modes considered, the partial or complete loss of the tread of a tire with which an aircraft landing gear is equipped, is a critical failure mode that occurs during aeroplane takeoff or landing phases.

This failure mode occurs, in particular, when the tire runs over a blunt object that might by chance be present on the runway. Bearing in mind the harsh conditions of use of an aeroplane tire, which are characterized by a high inflation pressure, a high static loading and a high speed, the tread of the tire running over the blunt object causes damage to the tread which generally results in the cutting of the tread and then in pieces of tread of varying geometric dimensions and mass being thrown up.

The pieces of tread may then either strike the structures of the aeroplane and lead to significant structural damage, because of the mechanical energy stored up by the said pieces, the higher the mass and speed at which the pieces are thrown up, the higher this mechanical energy is, or may enter the aeroplane engines and lead to problems with the operation of the said engines, if these engines are unable to absorb the pieces of tread because they are too great in size.

Reinforcing the structures of the aeroplane in order to withstand potential impacts, particularly those of pieces of tread, has been considered. However, for the same materials, this solution entails increasing the mass of the structure, something which is penalizing as far as aeroplane performance is concerned, which is why increasingly lightweight structural materials are being used. Mechanically strengthening the structure does not, however, solve the problem of pieces being thrown into the engines.

Devices affording protection against pieces of tread being thrown up have also been considered. Document WO 2010012913 describes a protective panel, the external surface of which comprises a composite material, and mounted, via deformable components, on a support connected to the structure of the aeroplane. The deformable components, fixed to several support stiffening components and perpendicular to the external surface of the protective panel are designed to buckle under the effect of impact by thrown up pieces of tread. Document WO 2010052447 describes a device that protects the engines of an aeroplane from thrown up tire tread debris. This device comprises a protective bar connected in a pivoting manner to the aeroplane main landing gear, the protective bar being able to move between a first and a second position. In the first position, the protective bar extends laterally across the mounted assembly consisting of the tire and of a wheel, to intercept possible paths of tread debris.

Another family of solutions describes devices that break up the tread with a view to minimizing the size of the pieces of tread and therefore minimizing impacts with the aeroplane. Document U.S. Pat. No. 7,669,798 describes break up means situated between the wheel and another part of the aeroplane and able to break up into several pieces the bit of tread which has become detached from the tire and is being thrown up towards the other part of the aeroplane. These break up means, such as a grating with blades able to cut up the material of the tread, are designed to disperse the said pieces.

The aforementioned protective or break up devices have the disadvantage of constituting additional structures, the additional masses of which are penalizing to the payload of the aeroplane.

SUMMARY

The inventors have therefore set themselves the objective of reducing the dimensions and therefore the mass of the pieces of tread in the event of accidental tire tread separation, without the use of additional devices external to the tire, and therefore without penalizing the payload of the aeroplane.

This objective has been achieved, according to embodiments of the invention, by a tire for an aeroplane comprising:
- a tread intended to come into contact with the ground via a tread surface, and extending radially between a bottom surface and the tread surface,
- the tread comprising at least two circumferential ribs adjacent to at least one circumferential groove,
- each circumferential rib extending radially between the bottom surface and the tread surface, axially between two lateral faces and circumferentially around the entire periphery of the tire,
- the tread comprising rows of cavities formed in at least one circumferential rib and opening onto the tread surface, the rows of cavities, which are parallel to one another, are inclined with respect to the circumferential direction of the tire at an angle at least equal to 45°, and the rows of cavities being distributed circumferentially over at least part of the periphery of the tire with a circumferential spacing at least equal to 0.02 times and at most equal to 0.12 times the circumferential length of the periphery of the tire.

As a tire has a geometry that exhibits symmetry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane. The plane perpendicular to the axis of rotation of the tire and passing through the middle of the tread surface of the tire is referred to as the equatorial plane.

In what follows, the expressions "radially", "axially" and "circumferentially" respectively mean "in the radial direction", "in the axial direction" and "in the circumferential direction".

In general, a tire comprises a crown comprising a tread intended to come into contact with the ground via a tread surface, the said crown being connected by two sidewalls to two beads intended to come into contact with a rim.

The tread is a torus-shaped volume comprised radially between a radially inner bottom surface and a radially outer tread surface: this is the wearing part of the tire.

The bottom surface is a theoretical surface delimiting the maximum permissible degree of wear: when the level of wear reaches this bottom surface, the tire is withdrawn from service.

The tread surface is intended to come into contact with the ground. By convention, the axial width of the tread surface is defined as being the axial distance between the axial limits of contact of the tread surface, when the tire in the new condition is subjected to a radial deflection equal to 32%, under the combined action of the vertical load and the inflation pressure. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure as recommended, for example, by the Tire and Rim Association or TRA.

The tread is generally made up of raised elements extending radially outwards from the bottom surface, said raised elements being separated by voids. In the case of an aeroplane tire, the raised elements are usually circumferential ribs separated by circumferential voids referred to as circumferential grooves. A circumferential rib extends radially between the bottom surface and the tread surface, over a radial distance referred to as the radial height. It extends axially between two lateral faces, over an axial distance referred to as the axial width, the axial width being measured at the tread surface. Finally, it extends circumferentially and continuously over the entire periphery of the tire. By way of example, a tread of an aeroplane tire may comprise, symmetrically about the equatorial plane, two axially outermost ribs called the shoulder ribs, limited axially on the outside by the edges of the tread and on the inside by a circumferential groove, two intermediate ribs and, in the middle of the tread, a central rib. A central or intermediate rib is comprised axially between two circumferential grooves, whereas a shoulder rib is adjacent to a circumferential groove axially on the inside of the tread.

Radially on the inside of the tread is positioned the crown reinforcement which is the tire crown reinforcing structure. The crown reinforcement of an aeroplane tire generally comprises at least one crown reinforcing layer referred to as the crown layer. Each crown layer is made up of reinforcing elements coated in an elastomeric material, i.e. one based on natural or synthetic rubber, the said mutually parallel reinforcing elements making an angle of between +20° and −20° with the circumferential direction. In an aeroplane tire, the reinforcing elements of a crown layer are generally arranged circumferentially in an undulating curve.

Among the crown layers a distinction is made between the working layers that constitute the working reinforcement, usually comprising textile reinforcing elements, and the protective layers constituting the protective reinforcement, usually comprising metal or textile reinforcing elements and arranged radially on the outside of the working reinforcement. The working layers govern the mechanical behaviour of the crown. The reinforcing elements of the working layers are usually cords made up of spun textile filaments, preferably made of aliphatic polyamides or of aromatic polyamides. The protective layers essentially protect the working layers from attack likely to spread through the tread radially towards the inside of the tire. The reinforcing elements of the protective layers may be either cords made up of metal threads or cords made up of spun textile filaments.

According to embodiments of the invention, the tread comprises rows of cavities formed in at least one circumferential rib and opening onto the tread surface.

A cavity, within the meaning of embodiments of the invention, is a hole made in a circumferential rib opening onto the tread surface. A cavity may be located on an edge of a circumferential rib and open, on a lateral face of a circumferential rib, onto a circumferential groove. It may also be located axially between the lateral faces of the circumferential rib, opening onto the tread surface only but not onto a circumferential groove: in that case, the cavity is said to be internal to the circumferential rib. A cavity is a hole extending radially towards the inside over a significant radial height at least equal to half the radial height of the circumferential rib.

As a cavity is generally more or less symmetric about a plane perpendicular to the tread surface, this plane of symmetry is referred to as the mean plane of the cavity. The mean plane of the cavity thus allows the cavity to be positioned with respect to the circumferential direction of the tire.

A cavity, within the meaning of embodiments of the invention, is not a sipe, as used for example on the edges of the circumferential ribs of a tire for a heavy goods vehicle in order to combat irregular tire wear, these sipes generally having a small circumferential spacing of the order of a few millimeters. Neither, within the meaning of embodiments of the invention, is a cavity a transverse cut in the tread aimed at improving the traction of a tire for the driven axle of a heavy goods vehicle or for improving the engagement of the tread with ground of the construction site or field type in the case of a tire for a construction plant vehicle or agricultural vehicle. A cavity, within the meaning of embodiments of the invention, is an area of local weakening of the tread making the tread easier to cut at this cavity.

A row of cavities is a set of cavities the respective mean planes of which coincide. A row of cavities is characterized by its angular positioning with respect to the circumferential direction.

The tread comprises rows of cavities which are parallel to one another and inclined with respect to the circumferential direction of the tire at an angle at least equal to 45°. The rows of cavities are parallel to one another, which means to say that they all make the same angle with the circumferential direction. This angle is at least equal to 45°, which means to say that the direction of the rows of cavities is closer to the axial direction than to the circumferential direction.

The rows of cavities are distributed circumferentially over at least part of the periphery of the tire, at a circumferential spacing at least equal to 0.02 times and at most equal to 0.12 times the circumferential length of the periphery of the tire. The circumferential spacing is the circumferential distance between two consecutive rows of cavities, it being possible for this circumferential spacing to be constant or variable over the periphery of the tire. The circumferential length of the periphery of the tire is the developed length of the tread surface and can be measured on the tire in the new condition, not mounted on the rim and uninflated, using, for example, a tape measure.

When an aeroplane tire, in a takeoff or landing phase, runs over a blunt object, this object may cut the tread and start it cracking over a certain radial thickness. As this crack enters the contact patch in which the tread surface is in contact with the ground, under the action of cyclic mechanical stresses with each revolution of the wheel, this crack spreads radially towards the inside of the tire as far as the radially outermost crown layer, then spreads axially and circumferentially along the radially outer face of the radially outermost crown layer, causing the crown of the tire to be cut at the radially outermost crown layer. Under the effect of mechanical stresses and, in particular, centrifugal forces, the crack will spread radially towards the outside of the tire through the tread, at various azimuths of the tire. As a result, the portion of tread thus cut out in the form of pieces of varying dimensions, or even practically the entire tread, will detach from the tire and be thrown outwards with the risk of striking the structure of the aeroplane or of entering the engines.

In the case of a conventional tread, which means one comprising only circumferential ribs separated by circumferential grooves but not comprising rows of cavities as defined by the invention, the pieces of tread may extend axially over an axial portion or over the entire axial width of the tread. Circumferentially, the pieces of tread may extend over a large proportion of the periphery of the tire, or even over the entire periphery thereof. As a result, the pieces of tread thrown up have penalizing dimensions and masses likely to damage the structures or engines of the aeroplane.

In the case of a tread according to embodiments of the invention, namely one which comprises, in addition to circumferential ribs separated by circumferential grooves, rows of cavities, the pieces of tread have axial and circumferential dimensions that are far smaller than in the case of a conventional tread.

This is because the cavities constitute regions of preferential cutting of the tread insofar as they allow a local reduction in the radial thickness of the tread. This reduction in radial thickness leads to a hinge effect as the cavities enter and leave the contact patch in which the tread surface is in contact with the ground. It thus encourages the emergence of cracks spreading radially outwards from the radially outer face of the radially outermost crown layer. The mechanical stresses of alternately opening and closing the cavities as they pass through the contact patch with each revolution of the wheel encourage the cracks to spread and these cracks also open out more rapidly given the local reduction in radial thickness of the tread. In other words, the cavities constitute areas of local weakening encouraging the emergence of cracks and the cutting of the tread.

The rows of cavities also constitute planes of preferential cracking of the tread, thereby limiting the circumferential length of the pieces of tread. As a result, the circumferential length of a piece of tread should not theoretically exceed the circumferential distance or circumferential spacing between two consecutive rows of cavities. The choice of circumferential spacing thus governs the maximum circumferential length of the pieces of tread.

The presence of cavities in a circumferential rib causes the said circumferential rib to be cut, allowing it therefore to detach from the tire independently of the adjacent ribs. The axial width of the pieces of tread is thus reduced to the axial width of the rib.

The inventors have thus sought to optimize the axial distribution of the cavities between the circumferential ribs and the circumferential distribution of the rows of cavities along the periphery of the tire in order to obtain pieces of tread the maximum dimensions of which meet the aeroplane manufacturers' specifications.

According to embodiments of the invention, the rows of cavities are inclined with respect to the circumferential direction at an angle at least equal to 45°. The angle of inclination of the rows of cavities is thus closer to the axial direction than to the circumferential direction, and this encourages a movement of cyclic opening and closing of the cavities as these enter and then leave the contact patch. These cyclic openings and closings, on each revolution of the wheel, encourage the spread of cracks.

The rows of cavities are distributed circumferentially at a circumferential spacing at least equal to 0.02 times and at most equal to 0.12 times the circumferential length of the periphery of the tire. This range of values for the circumferential spacing is defined according to the desired maximum circumferential length of the pieces of tread likely to become detached from the tire. Furthermore, the maximum circumferential spacing, equal to 0.12 times the circumferential length of the periphery of the tire, guarantees that there will be at least one cavity per circumferential rib present in the contact patch. The reference contact patch is that of a new tire subjected to a combination of vertical load and inflation pressure leading to a radial deflection of 32%. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure.

Advantageously, the tread comprises rows of cavities formed in each circumferential rib. The presence of cavities in each circumferential rib guarantees that each circumferential rib will be cut up and will therefore be able to detach from the tire independently of the adjacent circumferential ribs.

For preference, the rows of cavities are inclined with respect to the circumferential direction at an angle at least equal to 80°. The effect of the cyclic opening and closing of the cavities as they pass through the contact patch is therefore maximized.

One preferred embodiment of the invention is for the rows of cavities to be distributed circumferentially at a circumferential spacing at least equal to 0.06 times the circumferential length of the periphery of the tire. This circumferential spacing means that at least two cavities per circumferential rib are present in the contact patch. This minimal circumferential spacing also guarantees the robustness of the circumferential ribs, the cutting of which is thus modest, and ensures that the maximum size of the pieces of tread is not too small.

For preference, the rows of cavities are distributed circumferentially over the entire periphery of the tire at a circumferential spacing that is constant. A uniform circumferential distribution of the rows of cavities is simpler for manufacture and allows the circumferential length of the pieces of tread to be made consistent. However, a variable spacing may prove necessary in order to take tire running noise constraints into consideration. Indeed those skilled in the art know that a nonuniform circumferential distribution of the cavities may contribute to a significant reduction in the noise generated by the tread of the tire as it is running, and this may be a constraint in the case of an aeroplane tire that is intended to run at very high speed.

Each row of cavities advantageously comprises at least one cavity internal to a circumferential rib and opening only onto the tread surface. To guarantee axial cutting of a circumferential rib that is wide, namely of an axial width typically greater than one quarter of the axial width of the tread surface, it is advantageous to position an additional cavity that is located axially between the lateral faces of the circumferential rib and opens onto the tread surface, but not onto a circumferential groove. This cavity is then referred to as being internal to the circumferential rib. Cracks may therefore spread more easily from one lateral face of the circumferential rib to the other between the cavity or cavities opening onto a circumferential groove and the interior cavity.

The radial height of a cavity, measured along the straight line that passes through the radially innermost point of the cavity and perpendicular to the tread surface, is advantageously at least equal to half the radial height of the circumferential rib and at most equal to the radial height of the circumferential rib. The minimum radial height guarantees, in the bottom of the cavity, a radial thickness of tread that is small enough to make the cracking of the tread easier. The maximum radial height guarantees that there is no spread beyond the maximum permitted tread wear. The optimizing of the radial height of the cavity is also dependent on the volume of tread required with regard to the intended tire wear performance.

Advantageously also, the length of the cavity, measured along the straight line, intersection of the mean plane of the cavity perpendicular to the tread surface and of the tread surface, is at most equal to one quarter of the axial width of the circumferential rib. Beyond that value, there is a risk that the cavity will start a crack in the circumferential rib, during normal operation, without there having been any damage to the tread by a blunt object.

The length of the cavity, measured along the straight line of the mean plane of the cavity perpendicular to the tread surface, the line being parallel to the tread surface at a given radial distance, also advantageously decreases between the tread surface and the radially innermost point of the cavity. This feature corresponds to a cavity the length of which decreases from the tread surface down to the bottom of the cavity. This design also allows the cavity to be made more robust against cracking under normal operation.

It is finally advantageous for the width of the cavity, measured in the tread surface perpendicular to the mean plane of the cavity perpendicular to the tread surface, to be at least equal to 1 mm, preferably at least equal to 3 mm. The value of 1 mm corresponds to a technological minimum in the case of a cavity in the form of a sipe, as conventionally used in the field of tires. The value of 3 mm corresponds to a preferred minimum value that guarantees the initiation of the cutting of the tread.

BRIEF DESCRIPTION OF DRAWINGS

The features and other advantages of embodiments of the invention will be better understood with the aid of FIGS. 1 to 7.

In order to make the invention easier to understand, FIGS. 1 to 7 have not been drawn to scale and are simplified depictions.

DETAILED DESCRIPTION OF SPECIFIC EMBODIMENTS

Figure 1:
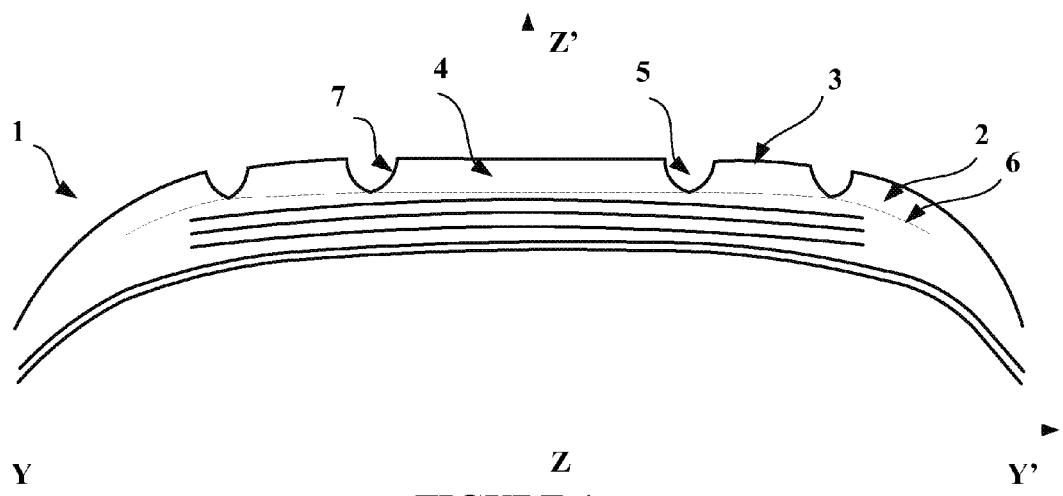
FIG. 1: meridian section through the crown of an aeroplane tire.

FIG. 1 shows a meridian section through the crown of the tire 1, namely a section in a meridian plane (YY', ZZ'), in which the directions YY' and ZZ' are the axial and radial directions respectively.

FIG. 1 shows a tire 1 for an aeroplane comprising a tread 2 intended to come into contact with the ground via a tread surface 3, and comprised radially between a bottom surface 6 and the tread surface 3. The tread 2 comprises five circumferential ribs 4, in this instance adjacent to at least one circumferential groove 5. Each circumferential rib 4 extends radially between the bottom surface 6 and the tread surface 3 and axially between two lateral faces 7 that form the walls of the circumferential groove 5. The tire 1 also comprises a crown reinforcement 8, made up of crown layers, radially on the inside of the bottom surface 6.

Figure 2:
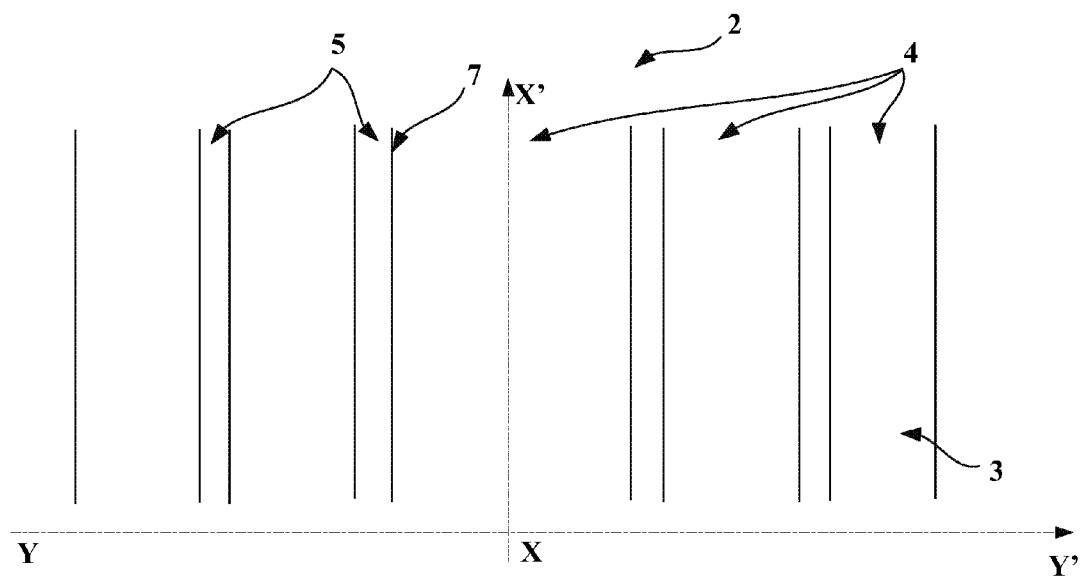
FIG. 2: plan view of a tread of an aeroplane tire of the prior art.

FIG. 2 shows a plan view of a tread of an aeroplane tire of the prior art. The tread 2 comprises five circumferential ribs 4; two shoulder circumferential ribs which are symmetric about the direction (XX'), two intermediate circumferential ribs which are likewise symmetric about the direction (XX') and a central circumferential rib. Each shoulder circumferential rib is bounded axially on the inside by a lateral face 7, forming one wall of a circumferential groove 5, and axially on the outside by the axial limit of the contact patch in which the tread surface (3) is in contact with the ground, which is defined by convention for a new tire subjected to a radial deflection of 32%. The intermediate and central circumferential ribs, which are comprised axially between two circumferential grooves 5 respectively, are bounded axially by lateral faces 7 forming the walls of a circumferential groove 5.

Figure 3:
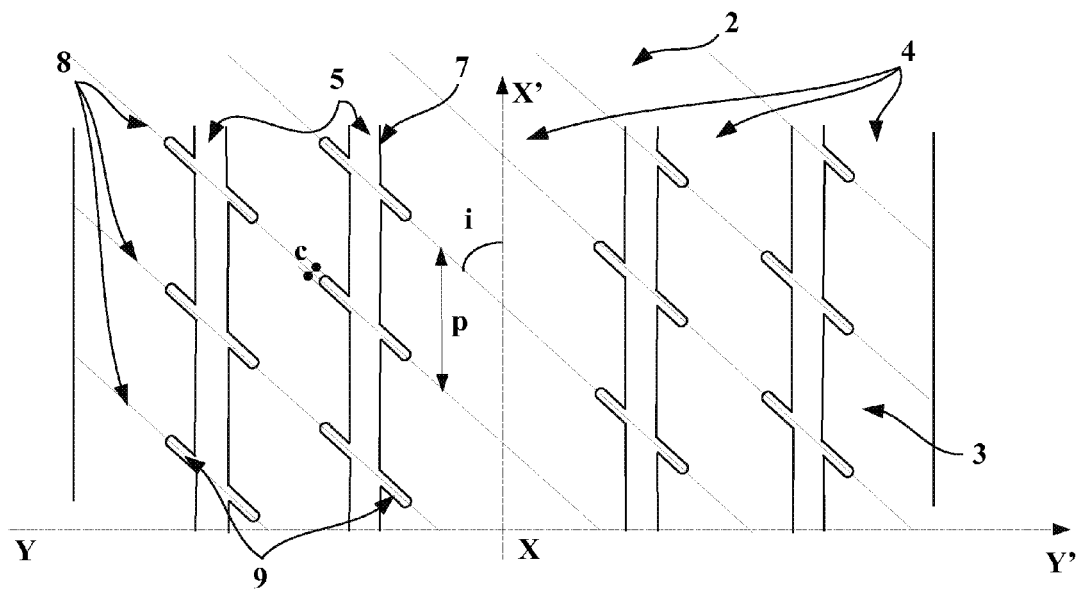
FIG. 3: plan view of a tread of an aeroplane tire according to a first embodiment of the invention.

FIG. 3 is a plan view of a tread 2 of an aeroplane tire according to a first embodiment of the invention. As in FIG. 1, the tread 2 comprises five circumferential ribs 4, respectively axially delimited by two lateral faces 7, forming the walls of a circumferential groove 5. The tread 2 comprises rows 8 of cavities 9 which are inclined with respect to the circumferential direction XX' of the tire, mutually parallel and circumferentially distributed over the entire periphery (not depicted) of the tire, at a circumferential spacing p at least equal to 0.02 times the circumferential length of the periphery of the tire. In this instance, the rows 8 of cavities 9 are inclined with respect to the circumferential direction XX' at an angle i equal to 45°. Each cavity 9 has a width c. Each shoulder circumferential rib 4 comprises a cavity 9 and each of the other circumferential ribs 4 comprises two cavities 9. Therefore, each row 8 of cavities 9, in this first embodiment of the invention, comprises 8 cavities 9 each one opening onto a circumferential groove 5.

Figure 4:
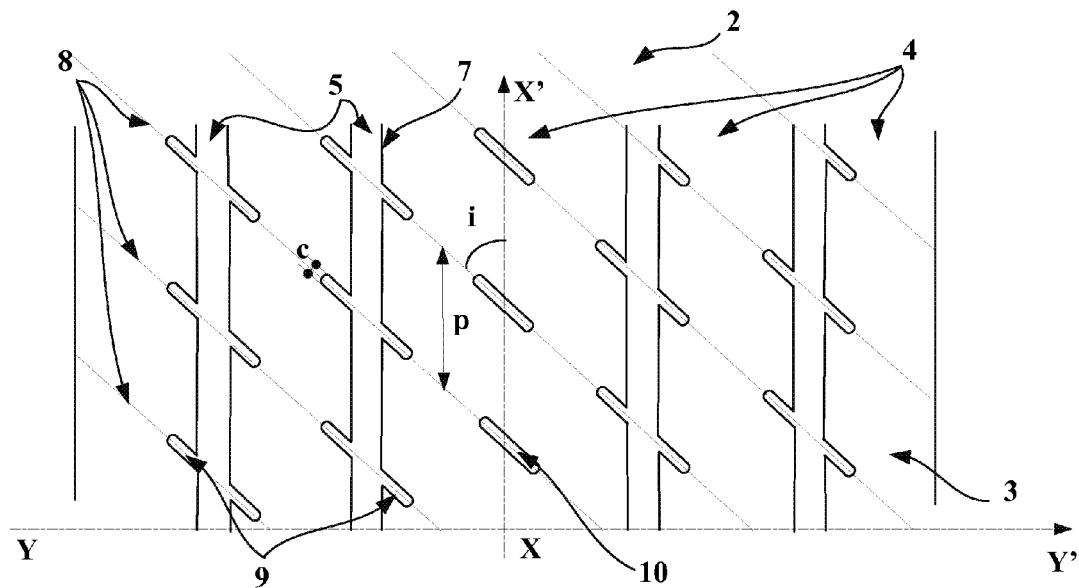
FIG. 4: plan view of a tread of an aeroplane tire according to an alternative form of the first embodiment of the invention.

FIG. 4 is a plan view of a tread 2 of an aeroplane tire according to an alternative form of the first embodiment of the invention. This alternative form differs from the first embodiment of the invention in FIG. 3 through the presence, in each row 8 of cavities 9, of a cavity 10 internal to the central circumferential rib 4 and opening only onto the tread surface 3. The addition of a cavity 10 internal to the central circumferential rib 4 is justified by the fact that the axial width of the central circumferential rib 4 is greater than one quarter of the axial width of the tread surface 3. In this alternative form, each row 8 of cavities 9 thus comprises 9 cavities, eight of which each open onto a circumferential groove 5.

Figure 5:
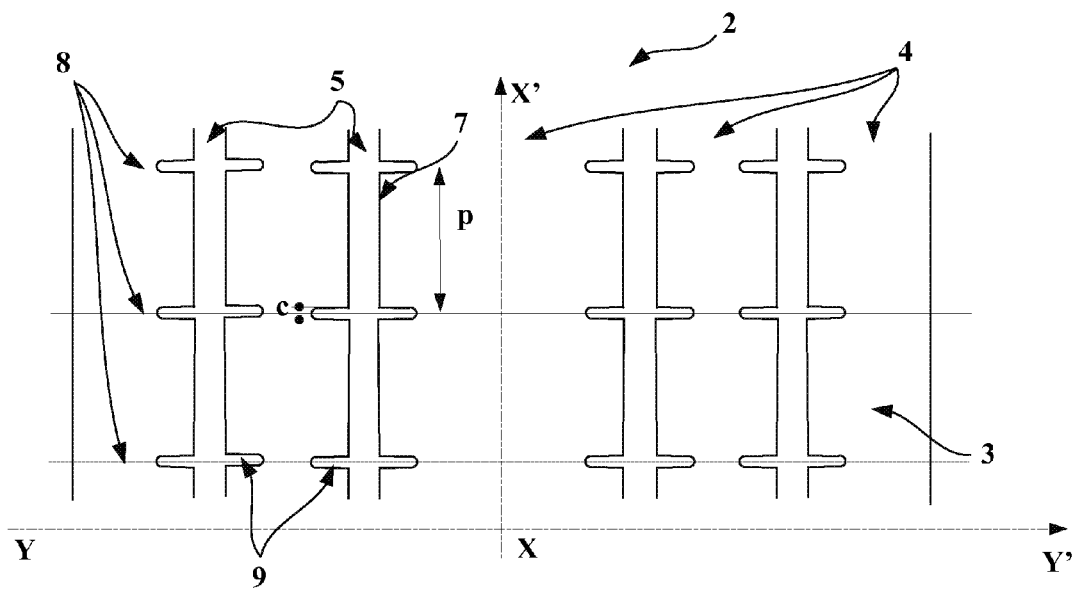
FIG. 5: plan view of a tread of an aeroplane tire according to a second embodiment of the invention.

FIG. 5 shows a plan view of a tread 2 of an aeroplane tire according to a second embodiment of the invention. This second embodiment differs from the first embodiment through the angle i formed by the rows 8 of cavities 9 with respect to the circumferential direction XX' which in this case is equal to 90°.

Figure 6:
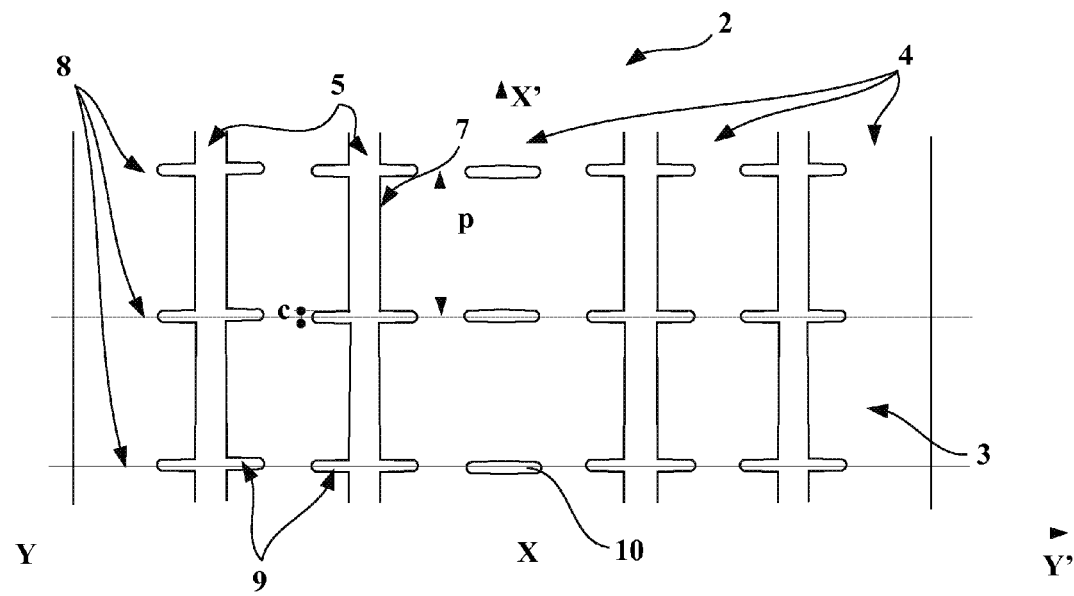
FIG. 6: plan view of a tread of an aeroplane tire according to an alternative form of the second embodiment of the invention.

FIG. 6 shows a plan view of a tread 2 of an aeroplane tire according to an alternative form of the second embodiment of the invention. This alternative form differs from the second embodiment of the invention of FIG. 5 through the presence, in each row 8 of cavities 9, of a cavity 10 internal to the central circumferential rib 4 and opening only onto the tread surface 3. The addition of a cavity 10 internal to the central circumferential rib 4 is justified by the fact that the axial width of the central circumferential rib 4 is greater than one quarter of the axial width of the tread surface 3. In this alternative form, each row 8 of cavities 9 thus comprises nine cavities, eight of which each open onto a circumferential groove 5.

Figure 7:
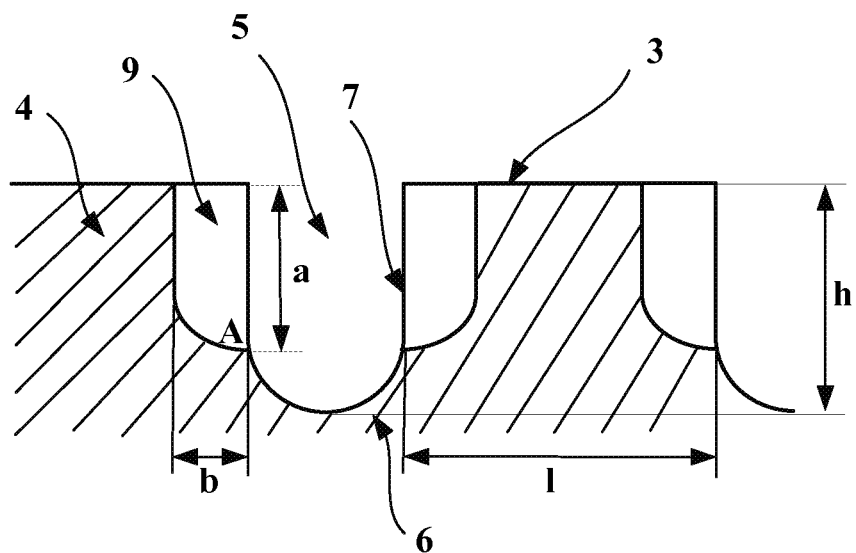
FIG. 7: view in cross section of a cavity at the edge of a circumferential rib on the mean plane of the cavity.

FIG. 7 shows a view in cross section of a cavity 9 at the edge of a circumferential rib 4 on the mean plane of the cavity. A cavity 9, formed in a circumferential rib 4 comprised radially between the bottom surface 6 and the tread surface 3 and bounded axially by a lateral face 7, opens both into the groove 5 and onto the tread surface 3. The radial height a of the cavity 9, measured along the straight line that passes through the radially innermost point A of the cavity 9 and perpendicular to the tread surface 3, is at least equal to half the radial height h of the circumferential rib 4 and at most equal to the radial height h of the circumferential rib 4. The length b of the cavity 9, measured along the straight line, intersection of the mean plane of the cavity 9 perpendicular to the tread surface 3 and of the tread surface 3, namely along the axial straight line of the mean plane contained in the tread surface, is at most equal to one quarter of the axial width 1 of the circumferential rib 4. In this instance, the length b of the cavity 9 is more or less constant over the entire radial height a of the cavity, except in the region of connection to the lateral face in the bottom of the cavity.

The inventors have realized the invention according to the embodiment of FIG. 5, with rows of cavities at the edge of circumferential ribs, the said rows of cavities being perpendicular to the circumferential direction, for an aeroplane tire of size 46×17R20, use of which is characterized by a nominal pressure of 15.9 bar, a nominal static loading of 20473 daN and a maximum reference speed of 225 km/h.

In the tire studied, the crown reinforcement comprises 7 working layers, comprising reinforcing elements made of hybrid material combining an aliphatic polyamide of aramid type and an aromatic polyamide of nylon type, the said reinforcing elements making a variable angle of between 0° and 12° with the circumferential direction. The crown reinforcement comprises radially, on the outside of the working layers, a protective layer comprising substantially circumferential metal reinforcing elements. The tread comprises five, shoulder, intermediate and central, circumferential ribs with respective axial widths of 34.5 mm, 33.5 mm and 82 mm. The tread comprises rows of cavities positioned at the edge of the circumferential grooves. The rows of cavities make an angle of 90° with the circumferential direction. The spacing of the rows of cavities, which is constant over the entire periphery of the tire, is equal to 121 mm, making it possible to have, in the circumferential direction, three cavities per edge of circumferential rib and, in the axial direction, eight cavities per row, namely 24 cavities in the contact patch in which the tread surface is in contact with the ground, when the new tire is subjected to a radial deflection of 32%. Each cavity has a width of 3 mm, a radial height of 12 mm and a length of 10 mm.

In the case of the reference design, the mass of the pieces of tread is between 0.1 kg and 3.5 kg whereas, in the design according to the invention, the mass of the pieces of tread is between 0.1 kg and 0.8 kg.

In order to control the maximum dimensions of the pieces of tread even better, the invention may advantageously be combined with suitable crown designs.

For example, it is conceivable for the crown reinforcement, and particularly the radially outermost crown layer which is generally a metal protective layer, to be brought as close as possible to the bottom surface, for example at a radial distance of the order of 2 mm away. This makes it possible to reduce by a corresponding amount the radial distance between the radially outermost crown layer and the bottom of the cavity and therefore the distance of cracking as cracking spreads radially outwards. In addition, the radial thickness of the pieces of tread is reduced and so too is their mass.

Another crown design solution likely to further enhance the effectiveness of the invention is for a tread separation means to be positioned radially on the inside of each circumferential rib to limit the dimensions of the pieces of tread following separation, which means to say the radial thickness, axial width and circumferential length thereof.

As the tread separation means is positioned radially on the inside of at least one circumferential rib between the bottom surface and the crown reinforcement, the crack initiated by a blunt object will spread radially inwards as far as the tread separation means, before progressing axially and circumferentially. In other words, the crack will spread less deeply by virtue of this tread separation means which impedes its radial spread. As the tread separation means is radially on the outside of the crown reinforcement, the maximum radial thickness of a piece of tread will be less than that obtained in the absence of a tread separation means. Moreover, the fact that it is radially on the inside of the bottom surface ensures that the tread separation means will not become visible as the circumferential rib wears and thus limit the wearing life of the tire.

Moreover, the tread separation means is positioned axially between the two edge corners of the said circumferential rib in the tread surface. In other words, each circumferential rib has its own individual tread separation means which does not extend axially beyond the edge corners of the said circumferential rib in the tread surface. This means that there is a discontinuity between the respective tread separation means of the circumferential ribs that make up the tread. As a result, the tread separation means is not a single means common to all of the circumferential ribs. That makes it possible to prevent the crack from spreading axially from one circumferential rib to another. Thus, if just one rib is damaged by a blunt object, that rib ought to be the only victim of cracking. In other words, only the circumferential rib concerned would be made to detach from the tire.

Finally, the tread separation means is arranged circumferentially over at least part of the circumference of the tire. In general, although not necessarily, the tread separation means will be continuous over the entire circumference of the tire. It could if appropriate be distributed over angular sectors that are to be optimized.

The inventors have been able to note that the presence of a tread separation means also made it possible to reduce the circumferential length of the pieces of tread. They interpreted this fact as being the result of cyclic flexing of the tread separation means, about the axial direction, at certain circumferentially distributed points of the tread separation means that may more or less correspond to the cavities formed in the circumferential ribs. In other words, the tread separation means is, along its circumference, subjected to hinge effects which may culminate in localized breakage of the tread separation means.

It is important to note that the material of the tread separation means needs to be chosen so that it does not make any mechanical contribution to the operation of the crown.

The tread separation means may advantageously comprise at least one tread separation layer, comprising mutually parallel reinforcing elements which are preferably, but not exclusively, made of aliphatic polyamide of the nylon type.

The invention claimed is:

1. A tire for an aeroplane, comprising:
   a tread adapted to come into contact with the ground via a tread surface, and extending radially between a bottom surface and the tread surface,
   wherein the tread comprises at least two circumferential ribs adjacent to at least one circumferential groove,
   wherein each circumferential rib extends radially between the bottom surface and the tread surface, axially between two lateral faces and circumferentially around the entire periphery of the tire,
   wherein the tread comprises rows of cavities formed in at least one circumferential rib and opening onto the tread surface, wherein the rows of cavities, which are parallel to one another, are inclined with respect to the circumferential direction (XX') of the tire at an angle (i) at least equal to 45°, and
   wherein the rows of cavities are distributed circumferentially over at least part of the periphery of the tire with a circumferential spacing (p) at least equal to 0.02 times and at most equal to 0.12 times the circumferential length of the periphery of the tire, and
   a circumferential rib extends axially between two lateral faces over an axial width (l) wherein a length (b) of the cavity, measured along the straight line, intersection of the mean plane of the cavity perpendicular to the tread surface and of the tread surface, is at most equal to one quarter of the axial width (l) of the circumferential rib.

2. The tire for an aeroplane according to claim 1, wherein the tread comprises rows of cavities formed in each circumferential rib.

3. The tire for an aeroplane according to claim 1, wherein the rows of cavities are inclined with respect to the circumferential direction (XX') at an angle (i) at least equal to 80°.

4. The tire for an aeroplane according to claim 1, wherein the rows of cavities are distributed circumferentially at a circumferential spacing (p) at least equal to 0.06 times the circumferential length of the periphery of the tire.

5. The tire for an aeroplane according to claim 1, wherein the rows of cavities are distributed circumferentially over the entire periphery of the tire at a circumferential spacing (p) that is constant.

6. The tire for an aeroplane according to claim 1, wherein each row of cavities comprises at least one cavity internal to a circumferential rib and opening only onto the tread surface.

7. The tire for an aeroplane according to claim 1, wherein a circumferential rib extends radially between the bottom surface and the tread surface over a radial height (h), wherein a radial height (a) of a cavity, measured along a straight line that passes through a radially innermost point (A) of the cavity and perpendicular to the tread surface, is at least equal to half the radial height (h) of the circumferential rib and at most equal to the radial height (h) of the circumferential rib.

8. The tire for an aeroplane according to claim 1, wherein a width (c) of the cavity, measured in the tread surface perpendicular to the mean plane of the cavity perpendicular to the tread surface, is at least equal to 1 mm.

* * * * *